June 10, 1930.   R. S. BURDETTE   1,763,576

WHEEL ASSEMBLY

Filed April 7, 1928

Inventor
Richard S. Burdette.

By

Attorney

Patented June 10, 1930

1,763,576

UNITED STATES PATENT OFFICE

RICHARD S. BURDETTE, OF AKRON, OHIO, ASSIGNOR TO THE GOODYEAR TIRE & RUBBER COMPANY, OF AKRON, OHIO, A CORPORATION OF OHIO

WHEEL ASSEMBLY

Application filed April 7, 1928. Serial No. 268,172.

This invention relates to vehicle wheel assemblies, and it has particular relation to an improved wheel assembly of the felloeless type wherein a tire carrying rim is secured, demountably, directly upon the spokes of a wheel.

It has been proposed heretofore to mount a rim, having tapered seating projections, directly upon the spokes of a wheel by means of wedges engaging the seating projections of the rim and inclined seats formed on the spokes. In all such instances, however, so far as the applicant is aware, it has been necessary to accurately machine the seating surfaces, both on the rim and on the spokes, to insure proper engagement of the wedges therewith.

Since the operation of machining the rims and spokes is exceedingly laborious and time-consuming, it represents a large portion of the complete cost of the production of the resulting wheel assembly. Furthermore, after such a wheel assembly has been in service, the rim and sometimes the spokes become distorted after which it is practically impossible to accurately position the rim upon the wheel. This condition is due largely to the fact that the rim is supported upon the spokes by means of relatively wide contacting surfaces.

The primary object of this invention is to overcome the difficulties above mentioned by the provision of a wheel assembly wherein the wedge members engage both the rim and the spokes by line contact only, which permits flexing of the rim intermediate the lines of contact and also obviates the necessity of accurately machining the seating surfaces.

A further object of the invention is to provide rim positioning lugs so formed as to establish line contact only with the rim and the spokes of a wheel assembly.

A still further object of the invention is to provide rim positioning lugs which are formed to establish line contact with spaced portions of one member, and single line contact with another member.

For a better understanding of the invention reference may now be had to the accompanying drawings, forming a part of the disclosure wherein:—

Figure 1:
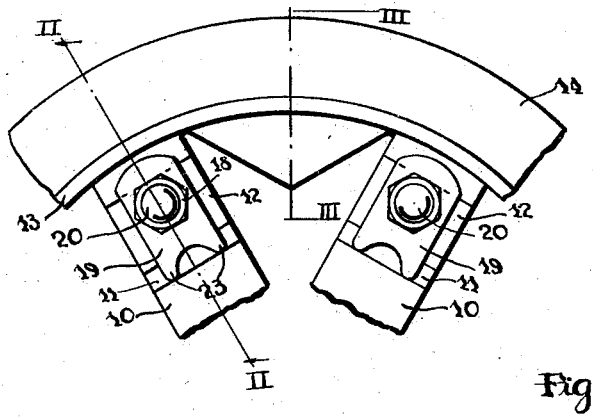
Figure 1 is a fragmentary side-elevational view of a portion of a wheel assembly embodying the novel features of the invention.
Figure 2:
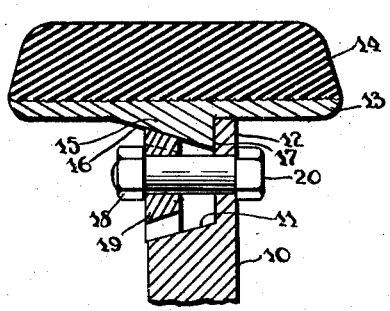
Figure 2 is a cross-sectional view taken substantially along the line II—II of Figure 1.
Figure 3:
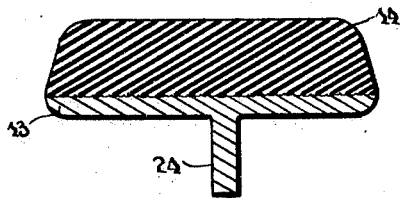
Figure 3 is a similar view taken substantially along the line III—III of Figure 1.
Figure 4:
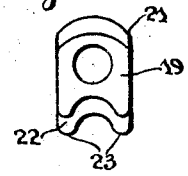
Figure 4 is a side-elevational view of a positioning lug as utilized in the embodiment of the invention illustrated in Figure 1.

In the embodiment of the invention illustrated in Figs. 1 to 4 inclusive, a plurality of spokes 10 radiating, in the usual manner, from a hub (not shown) are each formed adjacent the outer end with an inclined seat 11 and with a radially extending flange 12 adjacent the seat 11. A rim 13, which may have secured thereto a solid tire 14, is formed with a plurality of radially inwardly extending projections 15 formed to provide inclined seats 16 and shoulders 17 adjacent the seats 16. Bolts 20, carried by the flanges 12 of the spokes, and nuts 18 threaded thereon serve to position a plurality of wedging lugs 19 between the inclined seats 11 formed on the spokes and the respective seats 16 formed on the projections 15.

In contra-distinction to the present practice of employing positioning lugs formed with opposed flat inclined surfaces the lugs 19 are each formed with a curved inclined surface 21 and an opposed inclined surface 22 which is formed to provide a pair of rounded spaced ridges 23 for engagement with the respective seats 16 and 11.

The rim 13, which is formed intermediate the projections 15 with inwardly extending reinforcing webs 24, is more resilient adjacent the projections 15 which construction permits flexing of the rim in response to radial pressure exerted by the lugs 19.

Figure 5:
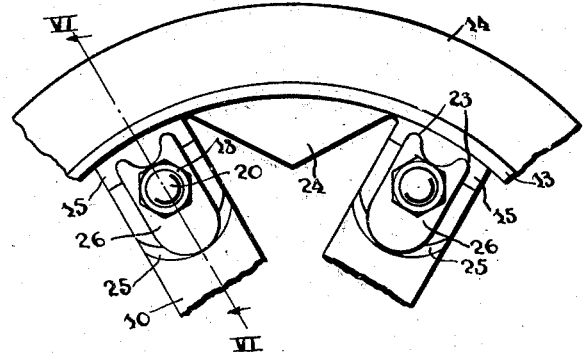
Figure 5 is a fragmentary side-elevational view of a portion of a wheel assembly embodying a modified construction.
Figure 6:
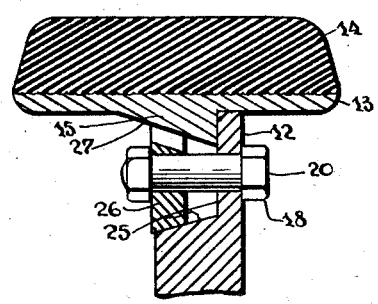
Figure 6 is a cross-sectional view taken substantially along the line VI—VI of Figure 5.
Figure 7:
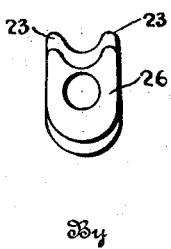
Figure 7 is a side-elevational view of a rim positioning lug of the type employed in the embodiment of the invention illustrated in Figure 5.

The embodiment of the invention illustrated in Figures 5, 6, and 7 inclusive differs from that just described in that the tapered seats 25 formed on the spokes 10 are arcuate instead of flat, and the lugs 26 are so formed and positioned as to establish single line contact with the seats 25 and spaced line contacts with the flat seats 27 formed on the projections 15 of the rim 13.

In the practice of the invention the rim 13 is positioned upon the spokes with the shoulders 17 in contact with the outer portions of the flanges 12 of the spokes. The positioning lugs are then placed upon the bolts 20 and forced into wedging relation with the surfaces 11 and 16 by means of the nuts 18.

Since line contact only is established between the positioning lugs 19 and the inclined seats of the spokes and the rim, accurate machining of the seats is not necessary. The lugs 19 may pivot about the bolts 20 until spaced line contacts with one of the members, and single line contact with the other member, has been established.

It has been found by experimentation that rims which have become deformed in service may be mounted readily in proper concentric relation by reason of the line contacts established between the positioning lugs and the seating surfaces on the rim and spokes. Obviously this result would be impossible to obtain if flat surfaced lugs were employed without first straightening the rim or remachining its seating surfaces.

Although I have illustrated only two forms which my invention may assume, and have described in detail only a single application thereof, it will be apparent to those skilled in the art that the invention is not so limited, but that various modifications may be made therein without departing from the spirit of the invention or from the scope of the appended claims.

What I claim is:

1. A wheel assembly including a spoke formed with an inclined seat, a rim formed with an inwardly extending projection providing an inclined seat, and a wedging member formed to make line contact with spaced portions of one of the inclined seats and single line contact with the other inclined seat.

2. A wheel assembly including a spoke formed with an inclined seat, a rim formed with an inwardly extending projection providing an inclined seat, a wedging member formed to make line contact with spaced portions of one of the inclined seats and single line contact with the other inclined seat, and means for positioning and maintaining the member in position between the seats.

3. A wheel assembly including a plurality of radiating spokes each formed with an inclined seat; a rim formed with spaced projections providing inclined seats; wedging members, each formed on one side with a pair of spaced ridges and on the other side with a single ridge, interposed between the rim seats and the seats on the respective spokes.

4. A wheel assembly including a plurality of radiating spokes each formed with an inclined seat; a rim formed with spaced projections providing inclined seats; wedging members, each formed on one side with a pair of spaced ridges and on the other side with a single ridge, interposed between the rim seats and the seats on the respective spokes; and means traversing the members and the spokes for maintaining the members in position between the seats.

5. A rim positioning lug having a pair of opposed inclined surfaces; one of the surfaces being formed to provide a pair of spaced parallel ridges.

6. A rim positioning lug having a pair of opposed inclined surfaces; one of the surfaces being formed to provide a pair of spaced parallel ridges and the other being formed to make line contact with an engaging plane surface.

7. A rim positioning lug having a pair of opposed inclined surfaces, one of the surfaces being curved and the other being formed to provide a pair of spaced ridges.

8. A wheel formed with an inclined seat, a rim formed with an inwardly extending projection providing an inclined seat, and a wedging member formed to make line contact with spaced portions of one of the inclined seats and single line contact with the other inclined seat.

9. A wheel formed with an inclined seat, a rim formed with an inwardly extending projection providing an inclined seat, a wedging member formed to make line contact with spaced portions of one of the inclined seats and single line contact with the other inclined seat, and means for positioning and maintaining the member in position between the seats.

In witness whereof, I have hereunto signed my name.

Signed at Akron, in the county of Summit and State of Ohio, U. S. A., this 5th day of April, 1928.

RICHARD S. BURDETTE.